United States Patent
Jones et al.

(10) Patent No.: US 7,583,823 B2
(45) Date of Patent: Sep. 1, 2009

(54) METHOD FOR LOCALIZING IRISES IN IMAGES USING GRADIENTS AND TEXTURES

(75) Inventors: Michael J. Jones, Somerville, MA (US); Guodong Guo, Madison, WI (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 737 days.

(21) Appl. No.: 11/329,742

(22) Filed: Jan. 11, 2006

(65) Prior Publication Data

US 2007/0160267 A1      Jul. 12, 2007

(51) Int. Cl.
*G06K 9/00* (2006.01)
(52) U.S. Cl. .................... 382/117
(58) Field of Classification Search ......... 382/115–118, 382/108, 260, 162–164, 168–171, 190, 199, 382/203
See application file for complete search history.

(56) References Cited

U.S. PATENT DOCUMENTS

| | | | | |
|---|---|---|---|---|
| 3,069,654 | A | | 12/1962 | Hough |
| 5,291,560 | A | * | 3/1994 | Daugman .................... 382/117 |
| 5,751,836 | A | * | 5/1998 | Wildes et al. ............... 382/117 |
| 6,229,907 | B1 | * | 5/2001 | Okano et al. ................ 382/117 |
| 7,438,234 | B2 | * | 10/2008 | Bonalle et al. .............. 235/487 |
| 2007/0160266 | A1 | * | 7/2007 | Jones et al. ................. 382/117 |
| 2007/0160308 | A1 | * | 7/2007 | Jones et al. ................. 382/260 |

OTHER PUBLICATIONS

Ives et al. "Iris Segmentation for Recognition using Local Statistics," Signal. Systems and Computers, Oct. 28, 2005.
Cui et al. "A fast and Robust Iris Localization Method Based on Texture Segmentation," Proceedings of SPIE, 2004.
Caitang et al. "Study and Improvement of Iris Location Algorithm," Advance in Biometrics, Jan. 7, 2006.
Jain, A.K., Ross, A., Prabhakar, S.: An introduction to biometric recognition. IEEE Trans. on Circuits and Systems for Video Technology 14 (2004) 4-20.
Mansfield, T., Kelly, G., Chandler, D., Kane, J.: Biometric product testing final report. UK Biometric Work Group Report (2001).
Daugman, J.: How iris recognition works. IEEE Trans. on Circuits and Systems for Video Technology 14 (2004) 21-30.
Daugman, J.G.: High confidence visual recognition of persons by a test of statistical indenpendence. In: IEEE Trans. on Pattern Analysis and Machine Intelligence. vol. 15. (1993) 1148-1161.
Wildes, R.: Iris recognition: An emerging biometric technology. Proc. IEEE 85 (1997) 1348-1363.
Boles, W., Boashash, B.: A human identification technique using images of the iris and wavelet transform. IEEE Trans. on Signal Processing 46 (1998) 1185-1188.

(Continued)

*Primary Examiner*—Sherali Ishrat
(74) *Attorney, Agent, or Firm*—Dirk Brinkman; Gene Vinokur

(57) ABSTRACT

A method for extracting an iris from an image is presented. Edges of an iris are detected in an image. Texture from the image is acquired. The edges and texture are combined to generate an inner boundary and an outer boundary of the iris. Also, to improve the accuracy of the iris boundary detection, a method to select between ellipse and circle models is provided. Finally, a dome model is used to determine mask images and remove eyelid occlusions in unwrapped images.

16 Claims, 14 Drawing Sheets

OTHER PUBLICATIONS

Lim, S., Lee, K., Byeon, O., kim, T.: Efficient iris recognition through improvement of feature vector and classifier. ETRI J. 23 (2001) 61-70.

Ma, L., Tan, T., Wang, Y., Zhang, D.: Personal identification based on iris texture analysis. In: IEEE Trans. on Pattern Analysis and Machine Intelligence. vol. 25. (2003) 1519-1533.

Ma, L., Tan, T., Wang, Y., Zhang, D.: Efficient iris recognition by characterizing key local variations. IEEE Trans. on Image Processing 13 (2004) 739-750.

Sun, Z., Tan, T., Wang, Y.: Robust encoding of local ordinal measures: A general framework of iris recognition. In: ECCV workshop on Biometric Authentication. (2004).

Crow, F.: Summed-area tables for texture mapping. In: Proceedings of SIGGRAPH. vol. 18. (1984) 207-212.

Viola, P., Jones, M.: Rapid object detection using a boosted cascade of simple features. In: IEEE Conference on Computer Vision and Pattern Recognition. vol. 1. (2001) 511-518.

Kim, J., Cho, S., Choi, J., Marks, R.: Iris Recognition Using Wavelet Features. In: Journal of VLSI Signal Processing 38 (2004) 147-156.

Cui, J., Wang, Y., Tan, T., Ma, L., Sun, Z.: A Fast and Robust Iris Localization Method Based on Texture Segmentation. In: SPIE Defense and Security Symposium, 2004.

Fitzgibbon, A., Pilu, M., Fisher, R.: Direct Least Squares Fitting of Ellipses. In: IEEE Transactions on Pattern Analysis and Machine Intelligence 21(5) (1999) 476-480.

Camus, T., Wildes, R.: Reliable and fast eye finding in close-up images. In: Proceedings of the IEEE International Conference on Pattern Recognition, 389-394, 2002.

\* cited by examiner

100

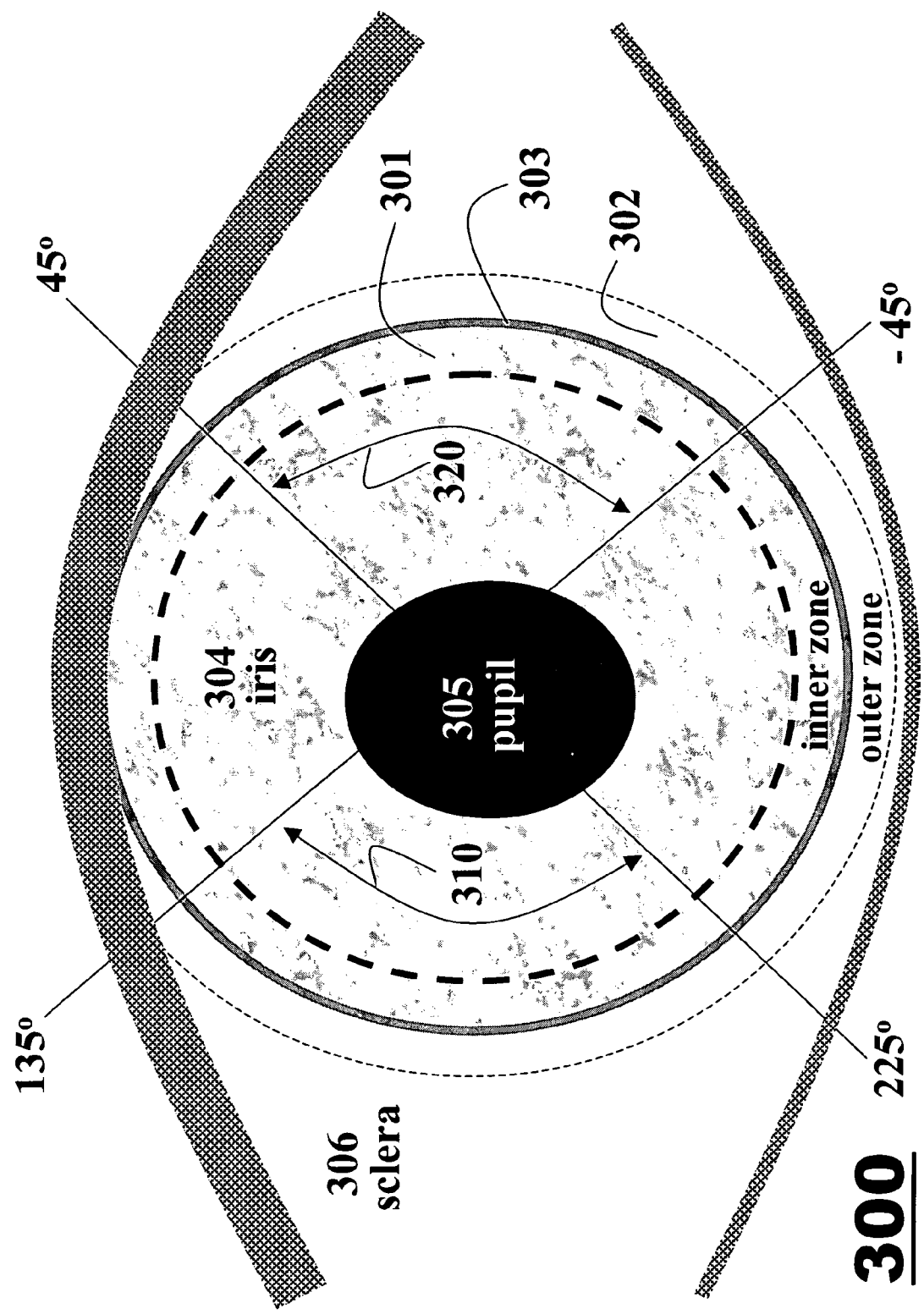

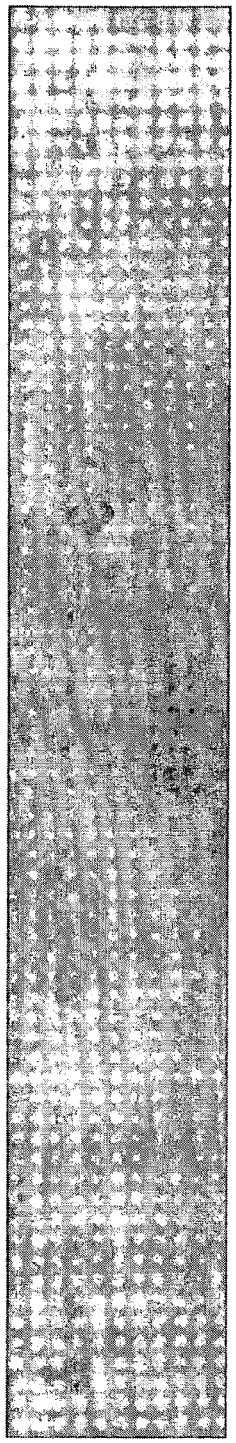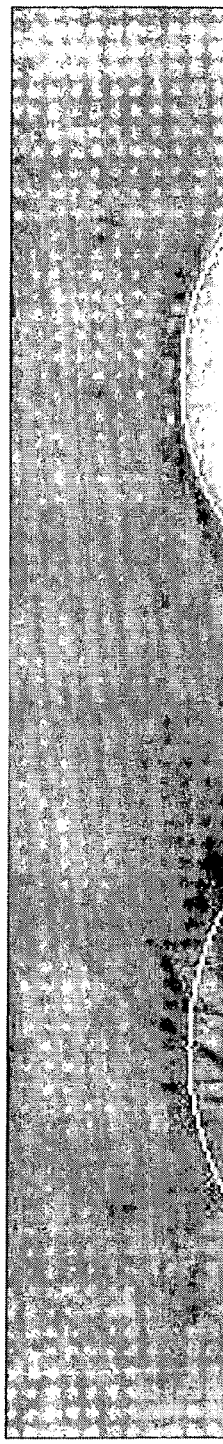

METHOD FOR LOCALIZING IRISES IN IMAGES USING GRADIENTS AND TEXTURES

RELATED APPLICATIONS

This application is related to U.S. patent application Ser. No. 11/329,624, "Method for Extracting Features of Irises in Images Using Difference of Sum Filters" and U.S. patent application Ser. No. 11/329,791, "Difference of Sum Filters for Texture Classification," both of which were co-filed with this application by Jones et al. on Jan. 11, 2006.

FIELD OF THE INVENTION

This invention relates generally to processing and recognizing biometric parameters, and more particularly to localizing an iris in an image of an eye.

BACKGROUND OF THE INVENTION

Many security systems require reliable personal identification or verification. Biometric technology overcomes many of the disadvantages of conventional identification and verification techniques, such as keys, ID cards, and passwords. Biometrics refers to an automatic recognition of individuals based on features representing physiological and/or behavioral characteristics.

A number of physiological features can be used as biometric cues, such as DNA samples, face topology, fingerprint minutia, hand geometry, handwriting style, iris appearance, retinal vein configuration, and speech spectrum. Among all these features, iris recognition has very high accuracy. The iris carries very distinctive information. Even the irises of identical twins are different.

Iris Localization

Typically, iris analysis begins with iris localization. One prior art method uses an integro-differential operator (IDO), Daugman, J. G., "High confidence visual recognition of persons by a test of statistical independence," IEEE Trans. on Pattern Analysis and Machine Intelligence, Volume 15, pp. 1148-1161, 1993, incorporated herein. The IDO locates the inner and outer boundaries of an iris using the following optimization, $$\max_{(r, x_0, y_0)} \left| G_\sigma(r) * \frac{\partial}{\partial r} \oint_{r, x_0, y_0} \frac{I(x, y)}{2\pi r} ds \right| \quad (1)$$

where I(x, y) is an image including an eye. The IDO searches over the image I(x, y) for a maximum in a blurred partial derivative with respect to an increasing radius r of a normalized contour integral of the image I(x, y) along a circular arc ds of the radius r and coordinates $(x_0, y_0)$ of a center. The symbol '*' denotes convolution, and $G_\sigma(r)$ is a smoothing function such as a Gaussian function of standard deviation σ.

The IDO acts as a circular edge detector. The IDO searches for a maximum of a gradient over a 3D parameter space. Therefore, there is no need to use a threshold as in a conventional Canny edge detector, Canny, J., "A computational approach to edge detection," IEEE Trans. on Pattern Analysis and Machine Intelligence, vol. 8, pp. 679-698, 1986.

Another method uses a Hough transform, Wildes, R., "Iris recognition: An emerging biometric technology," Proc. IEEE 85, pp. 1348-1363, 1997. That method detects edges in iris images followed by a circular Hough transform to localize iris boundaries. The Hough transform searches the optimum parameters of the following optimization, $$\max_{(r, x_0, y_0)} \sum_{j=1}^{n} h(x_j, y_j, x_0, y_0, r), \quad (2)$$

where $$h(x_j, y_j, x_0, y_0, r) = \begin{cases} 1, & \text{if } g(x_j, y_j, x_0, y_0, r) = 0 \\ 0, & \text{otherwise} \end{cases},$$

with $$g(x_j, y_j, x_0, y_0, r) = (x_j - x_0)^2 + (y_j - y_0)^2 - r^2,$$

for edge pixels $(x_j, y_j), j=1, \ldots, n.$

One problem of the edge detection and Hough transform methods is the use of thresholds during edge detection. Different threshold values can result in different edges. Different thresholds can significantly affect the results of the Hough transform, Proenca, H., Alexandre, L., "Ubiris: A noisy iris image database," Intern. Confer. on Image Analysis and Processing, 2005.

Most other methods are essentially minor variants of Daugman's IDO or Wildes' combination of edge detection and Hough transform, by either constraining a parameter search range or optimizing the search process. For example, Ma et al. roughly estimate a location of the pupil position using projections and thresholds of pixel intensities. This is followed by Canny edge detection and a circular Hough transform, Ma, L., Tan, T., Wang, Y., Zhang, D. "Personal identification based on iris texture analysis," IEEE, Trans. on Pattern Analysis and Machine Intelligence, vol. 25, pp. 1519-1533, 2003.

Masek describes an edge detection method slightly different from the Canny detector, and then uses the circular Hough transform for iris boundary extraction, Masek, L., Kovesi, P., "MATLAB Source Code for a Biometric Identification System Based on Iris Patterns," The School of Computer Science and Software Engineering, The University of Western Australia 2003.

Kim et al. use mixtures of three Gaussian distributions to coarsely segment eye images into dark, intermediate, and bright regions, and then use the Hough transform for iris localization, Kim, J., Cho, S., Choi, J. "Iris recognition using wavelet features," Journal of VLSI Signal Processing, vol. 38, pp. 147-156, 2004.

Rad et al. use gradient vector pairs at various directions to coarsely estimate positions of a circle and then use Daugman's IDO to refine the iris boundaries, Rad, A., Safabakhsh, R., Qaragozlou, N., Zaheri, M. "Fast iris and pupil localization and eyelid removal using gradient vector pairs and certainty factors," The Irish Machine Vision and Image Processing Conf., pp. 82-91, 2004.

Cui et al. determine a wavelet transform and then use the Hough transform to locate the inner boundary of the iris, while using Daugman's IDO for the outer boundary, Cui, J., Wang, Y., Tan, T., Ma, L., Sun, Z., "A fast and robust iris localization method based on texture segmentation," Proc. SPIE on Biometric Technology for Human Identification, vol. 5404, pp. 401-408, 2004.

None of the above methods use texture in the image for iris boundary extraction. In the method of Cui et al., texture is only used to roughly define an area in the image that is partially occluded by eyelashes and eyelids. A parabolic arc is fit to an eyelid within the area to generate a mask using Daugman's IDO.

Because of possible eyelid occlusions, eyelids can be removed using a mask image, Daugman, J., "How iris recognition works," IEEE Trans. on Circuits and Systems for Video Technology, vol. 14, pp. 21-30, 2004. Typical techniques detect eyelid boundaries in the images of the eye.

Daugman uses arcuate curves with spline fitting to explicitly locate eyelid boundaries. As stated above, Cui et al. use a parabolic model for the eyelids. Masek uses straight lines to approximate the boundaries of the eyelids. That results in a larger mask than necessary.

Almost all prior art methods estimate explicitly the eyelid boundaries in the original eye images. That is intuitive but has some problems in practice. The search range for eyelids is usually large, making the search process slow, and most important, the eyelids are always estimated, even when the eyelids do not occlude the iris.

Iris Feature Extraction

Daugman unwraps a circular image into a rectangular image after an iris has been localized using the integro-differential operator. Then, a set of 2D Gabor filters is applied to the unwrapped image to obtain quantized local phase angles for iris feature extraction. The resulting binary feature vector is called the 'iris code.' The binary iris code is matched using a Hamming distance.

Wildes describes another iris recognition system where a Laplacian of Gaussian filters are applied for iris feature extraction and the irises are matched with normalized correlation.

Zero-crossings of wavelet transforms at various scales on a set of 1D iris rings have been used for iris feature extraction, Boles, W., Boashash, B., "A Human Identification Technique Using Images of the Iris and Wavelet Transform," IEEE Trans. On Signal Processing, vol. 46, pp. 1185-1188, 1998.

A 2D wavelet transform was used and quantized to form an 87-bit code, Lim, S., Lee, K., Byeon, O., Kim, T. "Efficient iris recognition through improvement of feature vector and classifier," ETRI J., vol. 23, pp. 61-70, 2001. However, that method cannot deal with the eye rotation problem, which is common in iris capture.

Masek describes an iris recognition system using a 1D log-Gabor filter for binary iris code extraction. Ma et al. used two circular symmetric filters and computed the mean and standard deviation in small blocks for iris feature extraction with a large feature dimension, Ma, L., Tan, T., Wang, Y., Zhang, D., "Personal identification based on iris texture analysis," IEEE Trans. on Pattern Analysis and Machine Intelligence, vol. 25, pp. 1519-1533, 2003. Ma et al. also describes a method based on local variation analysis using a 1D wavelet transform, see also, Ma, L., Tan, T., Wang, Y., Zhang, D. "Efficient iris recognition by characterizing key local variations," IEEE Trans. on Image Processing, vol. 13, pp. 739-750, 2004.

Another method characterizes a local gradient direction for iris feature extraction, Sun, Z., Tan, T., Wang, Y. "Robust encoding of local ordinal measures: A general framework of iris recognition" ECCV workshop on Biometric Authentication, 2004. That method is computationally complex and results in relatively large feature vectors.

All of the prior art methods for iris feature extraction employ filtering steps that are computationally complex and time-consuming. There is a need for a method of iris feature extraction which can achieve high accuracy for iris matching in biometric identification protocols, and is less complex computationally.

SUMMARY OF THE INVENTION

Biometrics is important for security applications. In comparison with many other biometric features, iris recognition has a very high recognition accuracy. Successful iris recognition depends largely on correct iris localization.

In one embodiment of the invention, a method for localizing an iris in an image uses both intensity gradients and texture differences.

To improve the accuracy of iris boundary detection, a method for selecting between elliptical and circular models is described. Furthermore, a dome model is used to determine mask images and remove eyelid occlusions in unwrapped images.

For iris matching, a method for extracting features of an iris in an image is described. An unwrapped iris image is converted to an integral image by summations of pixel intensities. A novel bank of difference of sum filters is used to filter the integral image with far less computational complexity than is found in the prior art methods. The filtered output is binarized to produce an iris feature vector. The iris feature vector is used for iris matching.

BRIEF DESCRIPTION OF THE DRAWINGS

FIG. 3 is a schematic of an eye region including an iris to be localized according to an embodiment of the invention;

FIG. 8A an unwrapped iris image according to an embodiment of the invention;

FIG. 8B is an unwrapped iris image with one occluding eyelid detected according to an embodiment of the invention;

FIG. 8C is an unwrapped iris image with two occluding eyelids detected according to an embodiment of the invention.

DETAILED DESCRIPTION OF THE PREFERRED EMBODIMENTS

Figure 1:
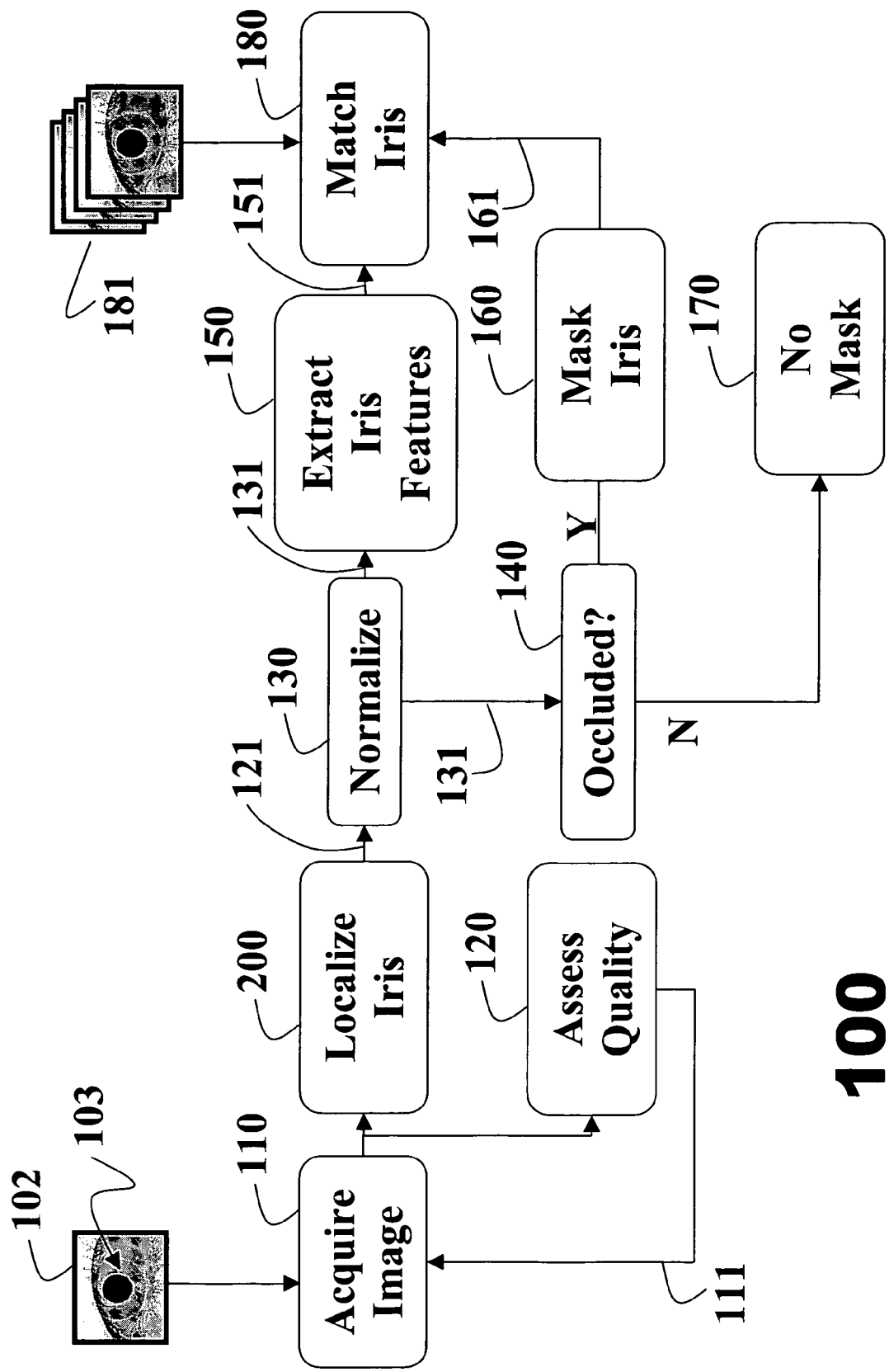
FIG. 1 is a flow diagram of a method for matching irises in images according to an embodiment of the invention.

FIG. 1 shows a method and system 100 for matching irises in images according to an embodiment of our invention. Iris localization can begin with acquiring 110 an image 102 of an eye. The eye includes an iris 103. Quality assessment 120 determines whether the image 102 is usable. If the eye image has a sufficient quality, then the system localizes 200 the iris 103 in the image, otherwise 111 another image is acquired 110. The localized image of the iris (iris image) 121 is normalized 130 to a rectangular image 131, called an 'unwrapped' image, having a predefined pixel configuration. A determination 140 is made to detect eyelid occlusions in the unwrapped iris image 131. If true, then a mask 161 is generated 160 and associated with the unwrapped image 131. If false, then there is no mask 170. Iris features 151 are extracted 150 from the unwrapped images and used, along with the mask 161, if any, for iris matching 180 when compared to feature vectors generated for a stored library 181 of irises.

Iris Image Localization

Figure 2A:
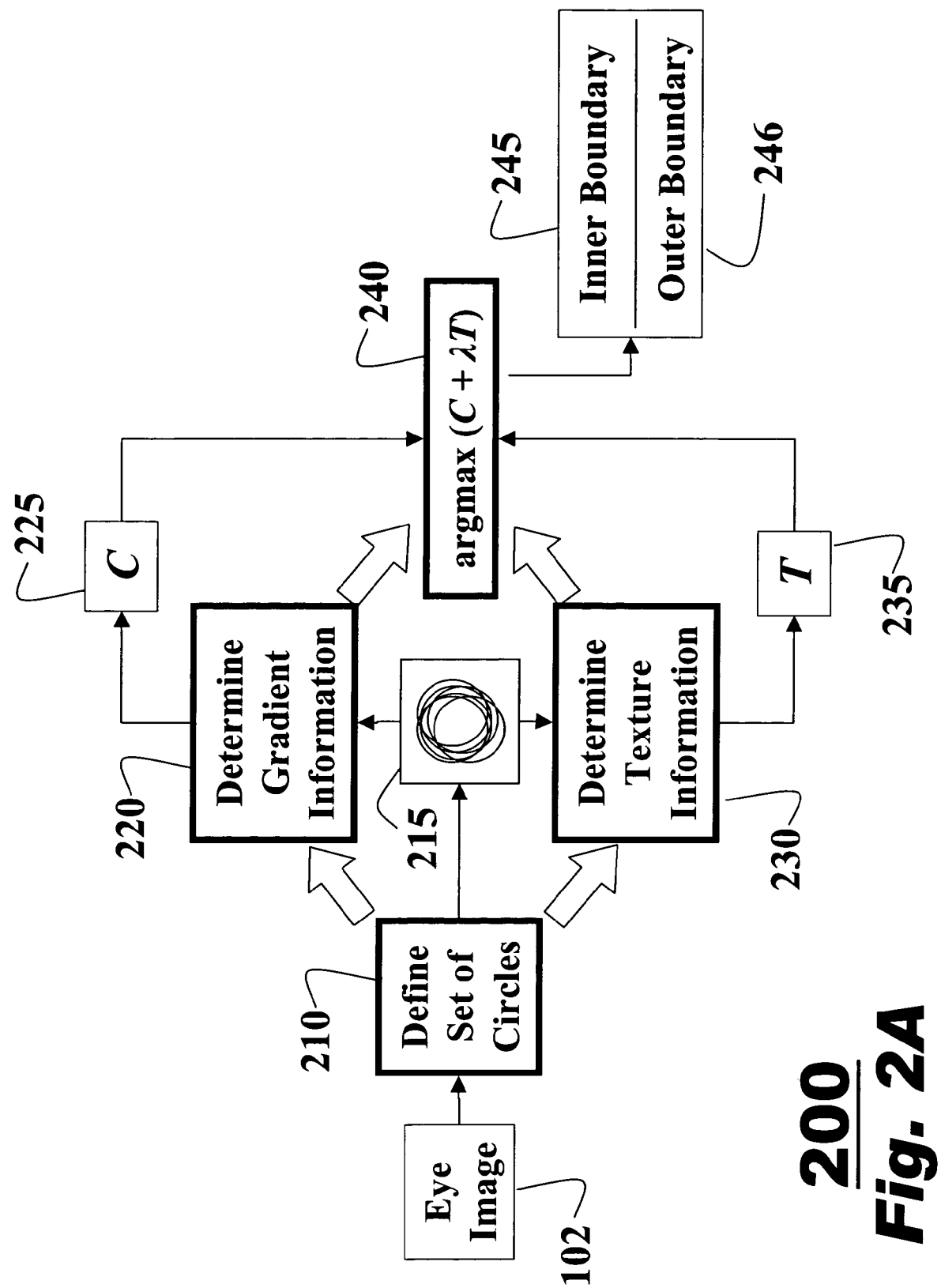
FIG. 2A is a flow diagram of a method for generating iris boundaries in images according to an embodiment of the invention.

FIG. 2A shows details of our localizing step 200. First, intensity gradient information 225 and texture information 235 of an iris in the eye image 102 are determined 220-230. The gradient information 225 and the texture information 235 are combined 240 to generate an inner boundary 245 and an outer boundary 246 of the iris in the image. Boundary generation 200 is described in further detail below. According to an embodiment of the invention, the gradient and texture information may be determined and combined for a set 215 of circles. A circle associated with a maximum of the combination 240 selected as the iris boundary. It should be noted that the above procedure can be used for locating both the inner and outer boundaries of the iris.

According to an embodiment, a set of circles 215 is defined 210. The set 215 of circles can have zero, one, or any number of circles. Also, the set 215 of circles can be constrained according to features of the image, for example, constraining a center of the circles to be approximate to a center of the pupil.

Figure 2B:
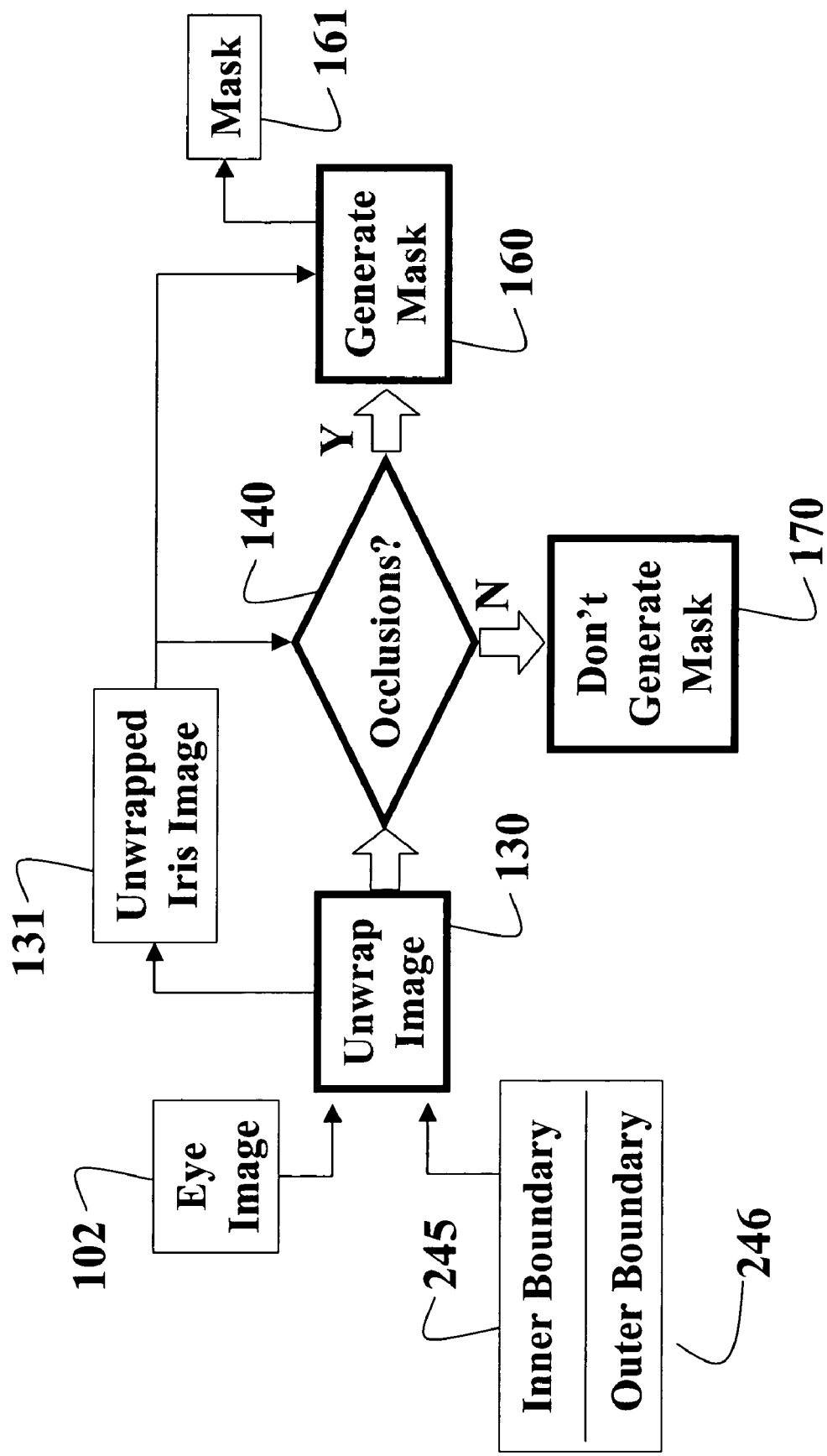
FIG. 2B is a flow diagram of a method for generating a mask according to an embodiment of the invention.

FIG. 2B shows a method for generating a mask according to one embodiment of the invention. The iris image 121 is normalized by unwrapping 130 the iris image 121 according to the inner and outer boundaries 245-246 of the iris, localized as described above. A determination 140 is made as to whether there are eyelid occlusions in the unwrapped iris image 131. If there are eyelid occlusions, then a mask 161 is generated 160. If not, then no mask is generated 170. As described in further detail below, the mask image 161 is generated 160 for the unwrapped images 131 instead of the input eye image 102, in contrast with the prior art.

As shown in FIG. 3, in an eye 300, the iris 304 is brighter than the pupil 305 and darker than the sclera 306. Therefore, most prior art iris localization methods use either intensity gradients or edge detection. Those methods depend on a strong intensity contrast between the pupil and the iris, and between the iris and the sclera. Often, those contrasts are insufficient for reliable iris localization.

We note that the iris 304 has a very different texture than the pupil and sclera. The pupil and sclera appear uniformly black and white, respectively, with essentially no texture. In contrast, the iris appears speckled or striated. We find this texture difference is useful for discrimination between the iris and the pupil or between the iris and the sclera, especially when the intensity contrast is relatively small. This can improve iris localization significantly.

An embodiment of the invention uses a combination of gradient information and texture differences. The formulation for iris localization can be expressed by the following optimization, $$(r^*, x_0^*, y_0^*) = \mathrm{argmax}_{(r, x_0, y_0)} C(I, x_0, y_0, r) + \lambda T(Z_i, Z_o, x_0, y_0, r), \quad (3)$$

where $C(.)$ represents a measure of magnitudes of gradients of pixels intensities substantially along a circle in the iris image, $T(.)$ represents a measure of texture difference on each side of the circle in the iris image, and $\lambda$ is a weighting parameter, e.g., 0.1. All circles within the set 215 of circles are examined to find the one that maximizes the weighted sum of a magnitude of the gradients of pixel intensities and texture difference.

The texture difference T measures a texture difference between an inner zone $Z_i$ 301 and an outer zone $Z_o$ 302 separated by the circle $(x_0, y_0, r)$ 303. The zones are substantially adjacent to the circle being examined. It should be understood that the texture difference according to an embodiment of the invention is used in determining boundaries of an iris, and should not be confused with prior art usage of texture to determine an occluded region of an iris. The same formulation can be used for both the inner boundary between the pupil and the iris, and the outer boundary between the sclera and the iris.

Because regions adjacent to the inner and outer boundaries are not necessarily uniform or homogeneous, only narrow zones next to the boundary are used to measure the texture differences.

The texture differences are measured between the inner and outer zones in addition to the gradient magnitude for iris localization. Because of possible eyelid occlusions, the search can be restricted to the left quadrant 310 and the right quadrant 320, i.e., 135° to 225° and −45° to 45° degrees. FIG. 3 also shows that the pupil 305 and iris 304 may not be concentric.

Intensity Gradient

The first term of Equation (3), $C(I, x_0, y_0, r)$ represents intensity gradient information. The term is evaluated using a gradient of pixel intensities along a circle, e.g., Daugman's integro-differential operator (IDO) can be used, see above.

Thus, we have $$C(I, x_0, y_0, r) = \left| G_\sigma(r) * \frac{\partial}{\partial r} \oint_{r, x_0, y_0} \frac{I(x, y)}{2\pi r} ds \right|, \quad (4)$$

where $I(x, y)$ is the image of the eye. The IDO determines intensity gradient information in the image $I(x, y)$ using a blurred partial derivative with respect to increasing radius r of a normalized contour integral of $I(x, y)$ along a circular arc ds of radius r and center coordinates $(x_0, y_0)$. The symbol (*) denotes convolution and $G_\sigma(r)$ is a smoothing function, such as a Gaussian function of standard deviation $\sigma$. The pixel intensities are normalized into a range [0, 1] for the purpose of measuring the gradient magnitudes. In one embodiment, a central difference approximation is used for gradient estimation with two pixel intervals. Other methods which examine and model non-circular boundaries, such as ellipses, can also be used.

Texture Differences

The second term in Equation (3), $T(Z_i, Z_o, x_0, y_0, r)$, represents a measure of how different the textures are in zones inside and outside a circle $(x_0, y_0, r)$. In one embodiment, a Kullback-Leibler divergence (KL-divergence) measures a distance (difference) between two probability density functions derived from the inner and outer zones 301-302, respectively. To efficiently represent the texture information without decreasing the accuracy of the iris localization, we use a method that adapts a local binary pattern (LBP) operator with a smallest neighborhood, i.e., four closest neighboring pixels.

The local binary pattern (LBP) operator is used to analyze textures, see generally, Maenpaa, T., Pietikainen, M. "Texture analysis with local binary patterns" In Chen, C., Wang, P., eds., Handbook of Pattern Recognition and Computer Vision. 3rd ed., World Scientific, pp. 197-216, 2005, incorporated herein by reference; and Ojala, T., Pietikinen, M., Harwood, D. "A comparative study of texture measures with classifications based on feature distributions," Pattern Recognition, vol. 29, pp. 51-59, 1996, incorporated herein by reference.

Local Binary Pattern (LBP) Operator

Figure 4:
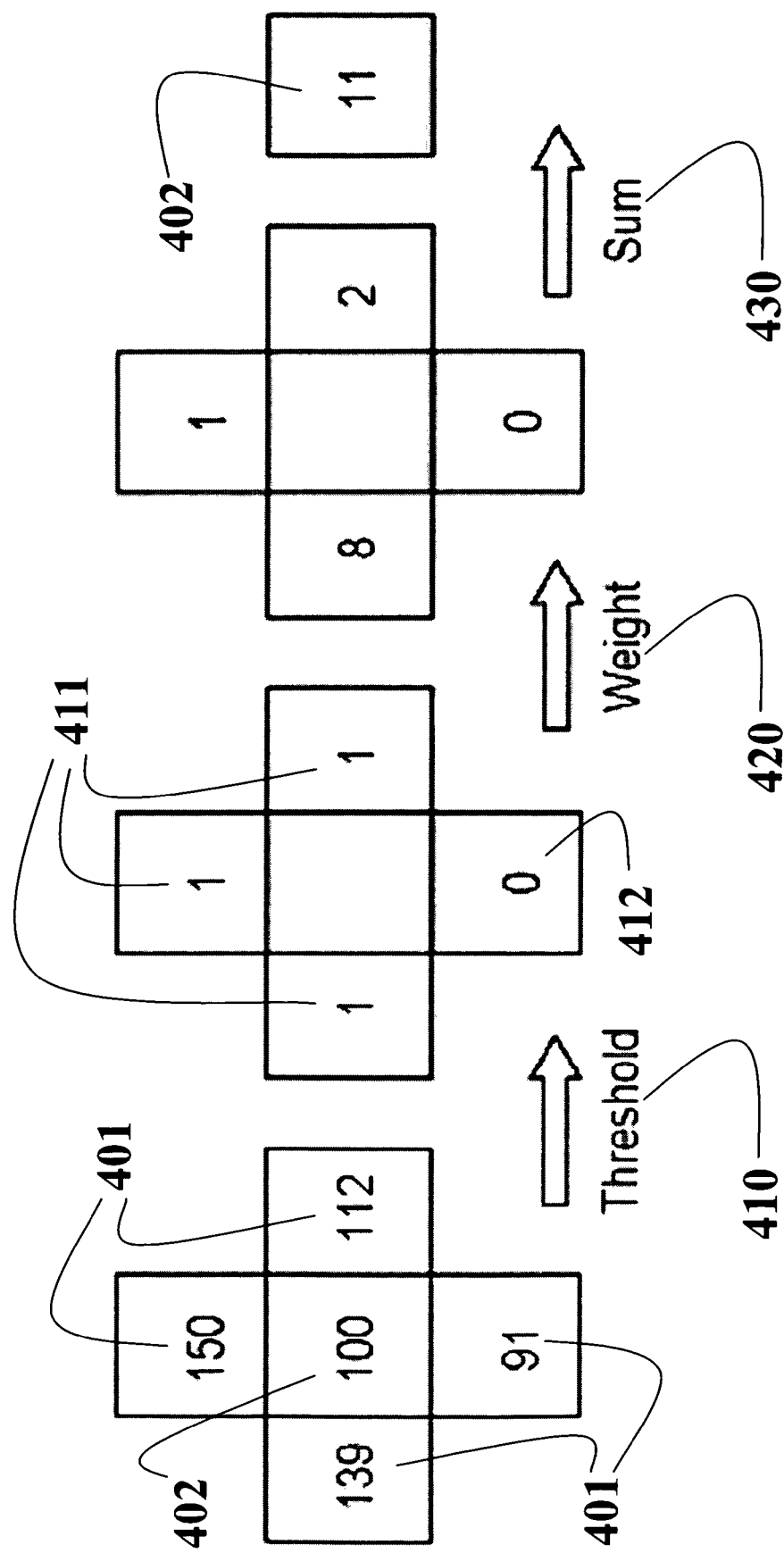
FIG. 4 is block diagram of a local binary pattern (LBP) operator in a 4-neighbor case according to an embodiment of the invention.

As shown in FIG. 4, the operation of LBP has three steps, threshold 410, weight 420, and sum 430. The pixel intensities (150, 139, 112, 91) of all pixels 401 immediately neighboring a pixel 402 are thresholded 410 using an intensity (100) of the center pixel 402 as the threshold. Neighboring pixels 411 with intensities greater than the threshold are assigned a value 1. Neighboring pixels 412 with intensities less than the threshold are assigned a value 0.

Next, the assigned value, either '0' or '1', of each neighboring pixel is weighted 420 with a weight that is a power of two. Finally, the weighted values of the neighboring pixels are summed 430 and assigned to the center pixel 402. This process is executed for each pixel under consideration.

Next, histograms of pixel values are determined dynamically for the boundary zones, based on the weighted values obtained from the LBP operation, described above. Probability density functions, $p(x)$ and $q(x)$, where x represents the indices of each bin in the histograms, are determined for the inner and outer zones, respectively. For example, $p(x)$ for the pixels in the inner zone can be defined according to $$p(x) = \frac{N_x}{\sum_{i=1}^{n} N_i},$$

where N is the population of weighted pixels values in a bin, n is the number of bins, and $x \in \{0, \ldots, n\}$. The probability density function $q(x)$ can be defined similarly for the histogram of the pixels in the outer zone. In one embodiment, the weighted values are in a range [0, 15]. Therefore, each histogram has sixteen bins. A difference, or 'distance,' between the probability density functions of corresponding bins of the histograms for the inner and outer zones is measured as a KL-divergence.

KL-Divergence

Given two histograms with probability density functions $p(x)$ and $q(x)$, the KL-divergence, or relative entropy, between p and q is defined as $$D(p\|q) = \sum_x p(x) \log \frac{p(x)}{q(x)} \Bigg|. \tag{5}$$

The KL-divergence $D(p\|q)$ is zero if and only if $p=q$, and positive otherwise. Although the distance between the distributions is not a true distance because the distance is not symmetric and does not satisfy the triangle inequality, it is still useful to think of the KL-divergence as a 'distance' between distributions.

As a result, the second term in Equation (3), in the case of a circular boundary, can be determined by the KL-divergence as $$T(Z_i, Z_o, x_0, y_0, r) = D(p(x; Z_i) \| q(x; Z_o))|, \tag{6}$$

where $Z_i$ and $Z_o$ are the inner and outer zones separated by the circle $(x_0, y_0, r)$ 301.

Figure 5A:
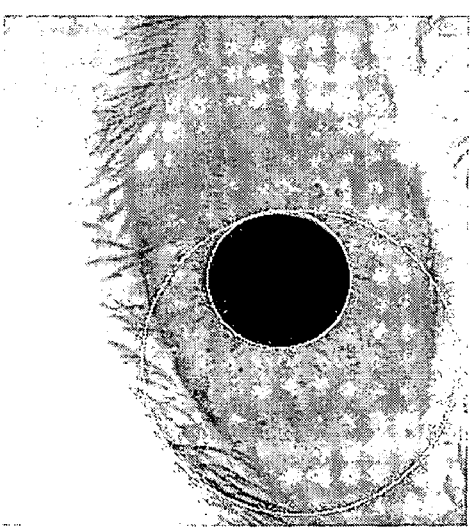
FIGS. 5A and 5D are images with iris boundaries detected according to a prior art Hough transform.
Figure 5B:
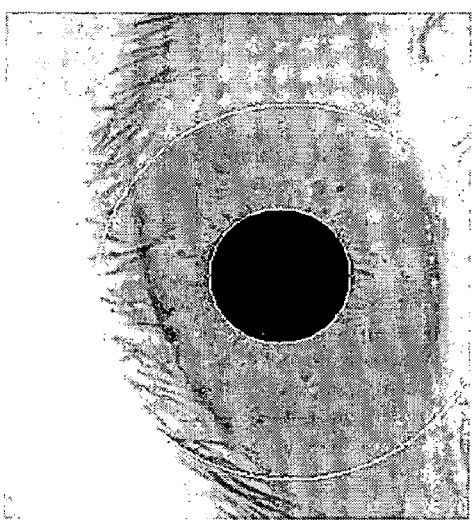
FIGS. 5B and 5E are images with iris boundaries detected according to a prior art integro-differential operator.
Figure 5C:
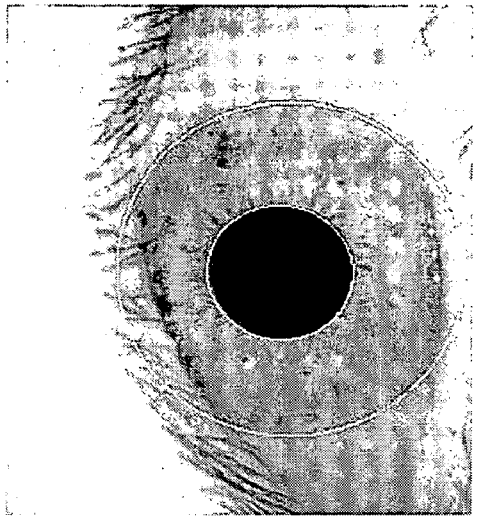
FIGS. 5C and 5F are images with iris boundaries detected according to an embodiment of the invention.
Figure 5D:
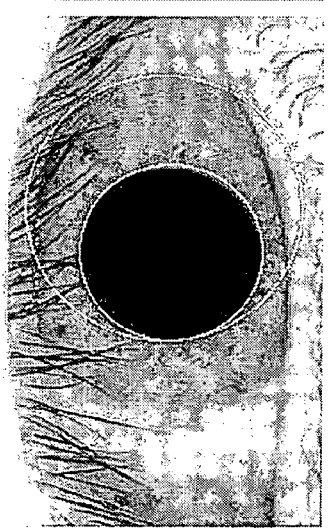
Figure 5E:
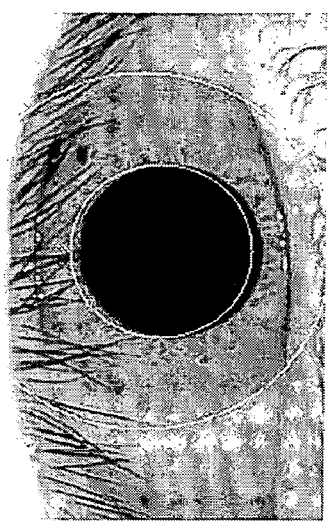
Figure 5F:
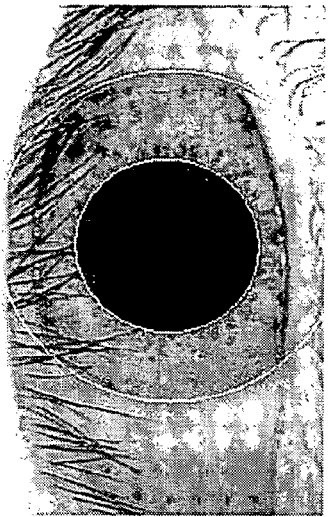

FIGS. 5A-5F compare a performance of the boundary localization method according to an embodiment of the invention with prior art methods. FIGS. 5A, 5B, 5D and 5E are for prior art methods and FIGS. 5C and 5F are for a method according an embodiment of the invention.

Model Selection

The inner and outer boundaries of an iris in an image of an eye can be modeled by circles or ellipses. The eccentricity of an ellipse is determined according to $$e \equiv \sqrt{1 - \frac{b^2}{a^2}}$$

for a conventional ellipse $$\frac{(x-x_0)^2}{a^2} + \frac{(y-y_0)^2}{b^2} = 1.$$

Theoretically, the eccentricity e satisfies $0 \leq e \leq 1$, and $e=0$ in the case of a circle. A conventional ellipse has the major and minor axes consistent with the x and y axes, while a fitted ellipse in iris images can be rotated with respect to the axes. A circle model is a special case of the elliptical model and computationally less complex.

Most prior art methods for iris localization use two circles to model the inner and outer boundaries of the iris. Circles are easy to determine, but the fit may not be exact due to non-orthogonal perspectives of view. An elliptical model may result in a better fit. This search is made in 4D space.

Although the above description is presented for a circular boundary model, the methods and procedures described, with minor modifications, can be used to implement elliptical models. Camus and Wildes used an ellipse to model the pupil/iris boundary and a circle to model the iris/sclera boundary, Camus, T., Wildes, R., "Reliable and fast eye finding in close-up images," Inter. Conf. on Pattern Recognition, pp. 389-394, 2002. We use either a circle or ellipse to obtain a best fit in all cases.

In one embodiment of the invention, model selection is a two-step approach. First, a circular model is used to approximate the inner and outer boundaries of the iris. Second, within a region slightly larger than the circular boundaries, the following steps are performed. Edges and texture information are obtained as described above. Chain codes are generated for the boundary points using 8-connectivity, that is, all adjacent pixels. A longest contour from all generated chains is selected to eliminate edge pixels that are 'outliers'.

An ellipse is fitted for the selected contour using a direct ellipse-fitting method, e.g., Fitzgibbon, A., Pilu, M., Fisher, R., "Direct least-square fitting of ellipses," IEEE Trans. on Pattern Analysis and Machine Intelligence, vol. 21, pp. 476-480, 1999, incorporated herein by reference. The direct ellipse-fitting method solves a generalized eigenvalue system to estimate parameters of the ellipse. The eccentricity e of the fitted ellipse is determined, and a decision whether to use an ellipse or a circle to model the iris boundary is made, with the criterion that, if e is greater then a threshold $e_T$, the ellipse model is selected, otherwise, the circle model is selected. The threshold eccentricity $e_T$ can be, for example, 0.19.

Figure 6C:
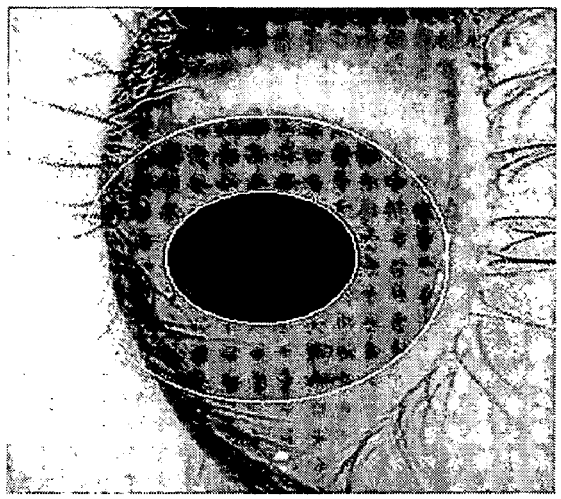
FIG. 6C is an image of an eye with elliptical iris boundaries detected according to an embodiment of the invention.
Figure 6B:
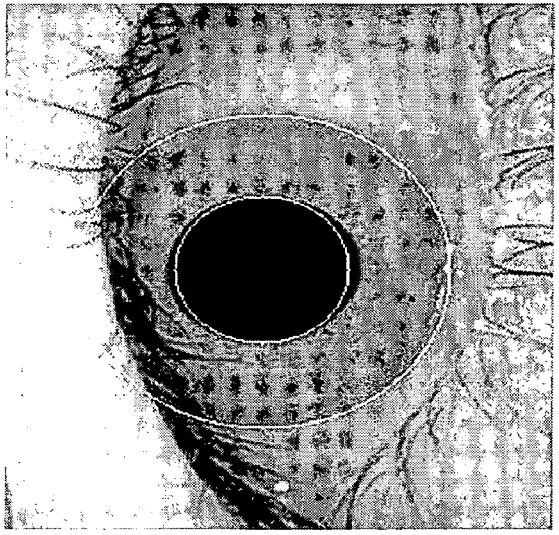
FIG. 6B is an image of an eye with circular iris boundaries detected using a prior art integro-differential operator.
Figure 6A:
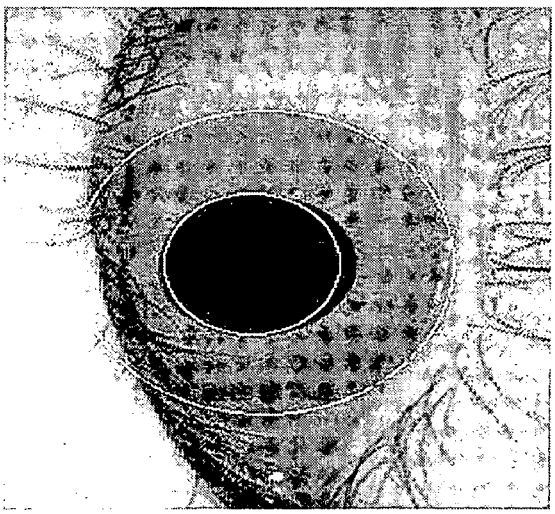
FIG. 6A is an image of an eye with circular iris boundaries detected using a prior art Hough transform.

FIGS. 6A-6C show the effects of circle and ellipse fitting for iris images. All circles and ellipses are drawn as a white line one pixel wide. The results in FIGS. 6A and 6B are obtained by the circle model for the inner boundary using the Hough transform and the IDO, respectively. As can be seen, a circle does not fit the pupil and iris boundaries well. The result in FIG. 6C uses direct ellipse fitting according to an embodiment of the invention and the boundaries are fitted precisely.

Masking

The iris is possibly occluded by the upper and/or lower eyelids. Some prior art methods exclude the top and bottom part of an iris for iris feature extraction and recognition. However, this may result in a loss of useful information when there is very little or no eyelid occlusion. Explicit modeling of the eyelids should allow better use of available information than simply omitting the top and bottom of the iris. Mask images may be generated and associated with the unwrapped iris image to model the eyelid occlusions.

Dome Model

Figure 7:
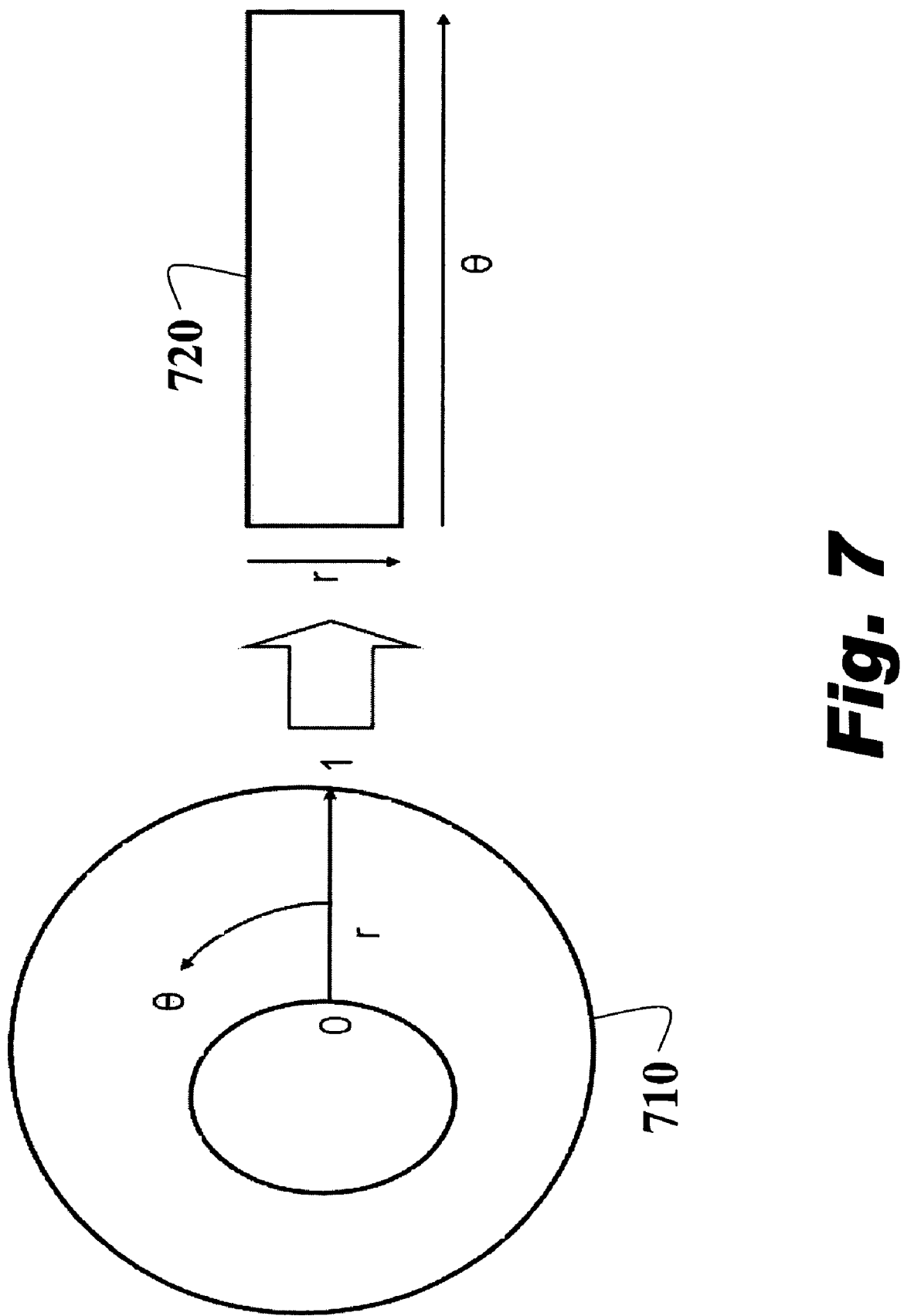
FIG. 7 is a block diagram of normalizing or unwrapping an image of an iris according to an embodiment of the invention.

FIG. 7 shows an iris 710, and a rectangular unwrapped iris 720. In an embodiment, the unwrapped image is and rectangular arrangement of 512×64 pixels. The unwrapping process is described by Daugman, J. G. "High confidence visual recognition of persons by a test of statistical independence," IEEE Trans. on Pattern Analysis and Machine Intelligence, vol. 15, pp. 1148-1161, 1993, incorporated herein by reference, and Ma, L., Tan, T., Wang, Y., Zhang, D. "Personal identification based on iris texture analysis," IEEE Trans. on Pattern Analysis and Machine Intelligence, vol. 25, pp. 1519-1533, 2003, incorporated herein by reference.

As shown in FIGS. 8A-8C, in contrast with the prior art, we determine eyelid occlusion in the unwrapped rectangular image rather than in the original eye image. The extracted eyelids can be modeled by an upper arc of a circle, hereinafter referred to as a 'dome.' There is no dome in FIG. 8A because there is no eyelid occlusion, a single dome in FIG. 8B because a single eye lid occludes, and two domes in FIG. 8C because of lower and upper eyelid occlusions.

According to one embodiment of the invention, occlusions from either the upper and lower eyelids can be processed in a similar way. One method according to an embodiment of the invention uses a 'least commitment strategy'.

First, there is a determination as to whether eyelid occlusions exist or not. If there are no occlusions, such as in FIG. 8A, then there is no need to generate a mask. When occlusions do exist, as in FIGS. 8B and 8C, the method determines how many domes (1 or 2) to search, and then finds the related domes. The method also has a post-processing stage to reduce possible erroneously detected occlusions. To extract the domes, a circle model according to an embodiment of the invention is used to approximate eyelid occlusions, instead of more complex models such as splines, parabolic models, or a rough model of straight lines.

To detect possible eyelid occlusions in the unwrapped image, regions of the unwrapped iris where an eyelid might appear are compared to a region where occlusion cannot occur. These regions are compared by looking at their respective distributions of raw pixel values. A chi-square distance measure is used to compare the histograms of raw pixel values in the two regions, i.e., $$\chi^2(M, N) = \sum_{b=1}^{B} \frac{(M_b + N_b)^2}{M_b + N_b}, \quad (7)$$

where M and N are two histograms to compare, each with B bins.

In greater detail, the mask determination according to an embodiment of the invention can include the following steps:

1. Extract three regions in the unwrapped image, denoted as $R_l$, $R_m$, and $R_r$ approximately corresponding to the regions containing the upper eyelid, the iris without occlusion for sure, e.g., the region between 135° and 225° degrees in FIG. 3, and lower eyelid, respectively, in the input eye image. The three regions are obtained, for example, with areas of 40×20 pixels, starting from the image bottom.
2. Determine the histogram of raw pixel values in each region, denoted as $H_l$, $H_m$, and $H_r$. The histograms, $H_l$, $H_m$, and $H_r$, are determined using 32 bins.
3. Determine the Chi-square distance, $X^2(H_m, H_l)$ and $X^2(H_m, H_r)$, using Equation (7).
4. Decide whether there are occlusions or not and if yes, how many domes, by checking $X^2(H_m, H_l) > T_o$ and $X^2(H_m, H_r) > T_o$, where $T_o$ is a threshold. For example, $T_o$ is equal to 0.26.
5. Search the domes if necessary, using Equation (3). Note that now the circle center is below the unwrapped image and only the top arc of the circle is fit to the eyelid.
6. Remove false alarms by checking whether the maximum value of the found dome satisfies $C(I, x^*_0, y^*_0, r^*) + \lambda T (Z_i, Z_o, x^*_0, y^*_0, r^*) > T_c$, where $T_c$ is a threshold set to, for example, 13.5 and $(x^*_0, y^*_0, r^*)$ is the found circle for the dome. If not, the extracted dome is a false alarm.

Iris Feature Extraction

Figure 9:
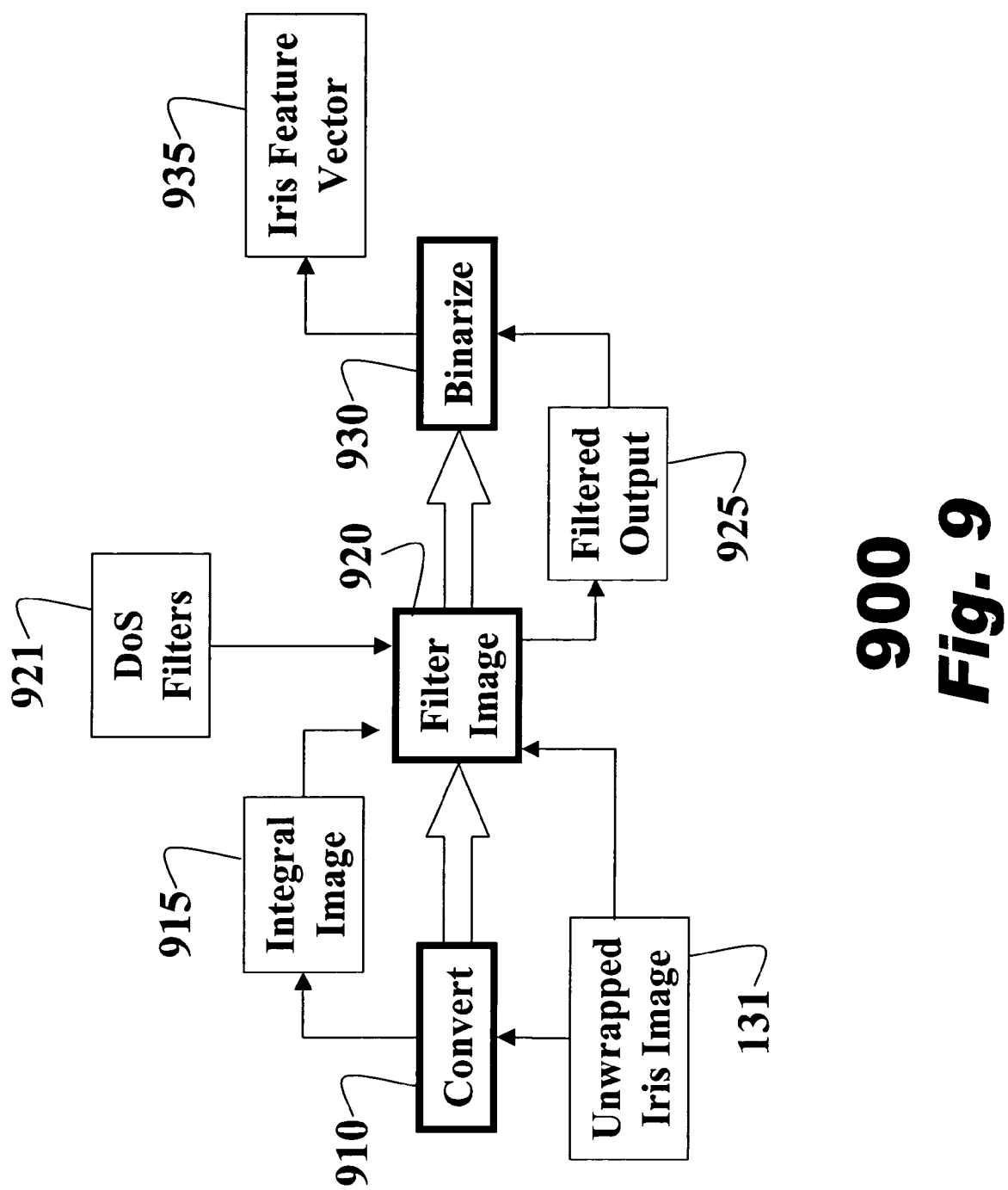
FIG. 9 is a flow diagram of a method for extracting an iris feature vector according to an embodiment of the invention.

FIG. 9 shows a method 900 for extracting features of an iris in an unwrapped iris image 131. According to an embodiment of the invention, the unwrapped iris image 131 can be converted 910 to an integral image 915. Using difference of sum (DoS) filters 921, described in further detail below, the unwrapped iris image 131 or the integral image 915 is filtered 920 to produce filtered output 925. The filtered output 925 is binarized 930 resulting in an iris feature vector 935 of the unwrapped iris image 131.

Integral Image

The DoS filtering, described in further detail below, can be performed with a pre-computed integral image 915. Crow first proposed the "summed-area tables" for fast texture mapping, Crow, F. "Summed-area tables for texture mapping," Proceedings of SIGGRAPH, vol. 18, pp. 207-212, 1984.

Viola and Jones use an "integral image" for rapid feature extraction in face detection, Viola, P., Jones, M., "Rapid object detection using a boosted cascade of simple features," IEEE Conference on Computer Vision and Pattern Recognition, vol. 1, pp. 511-518, 2001, incorporated herein by reference.

Figure 10:
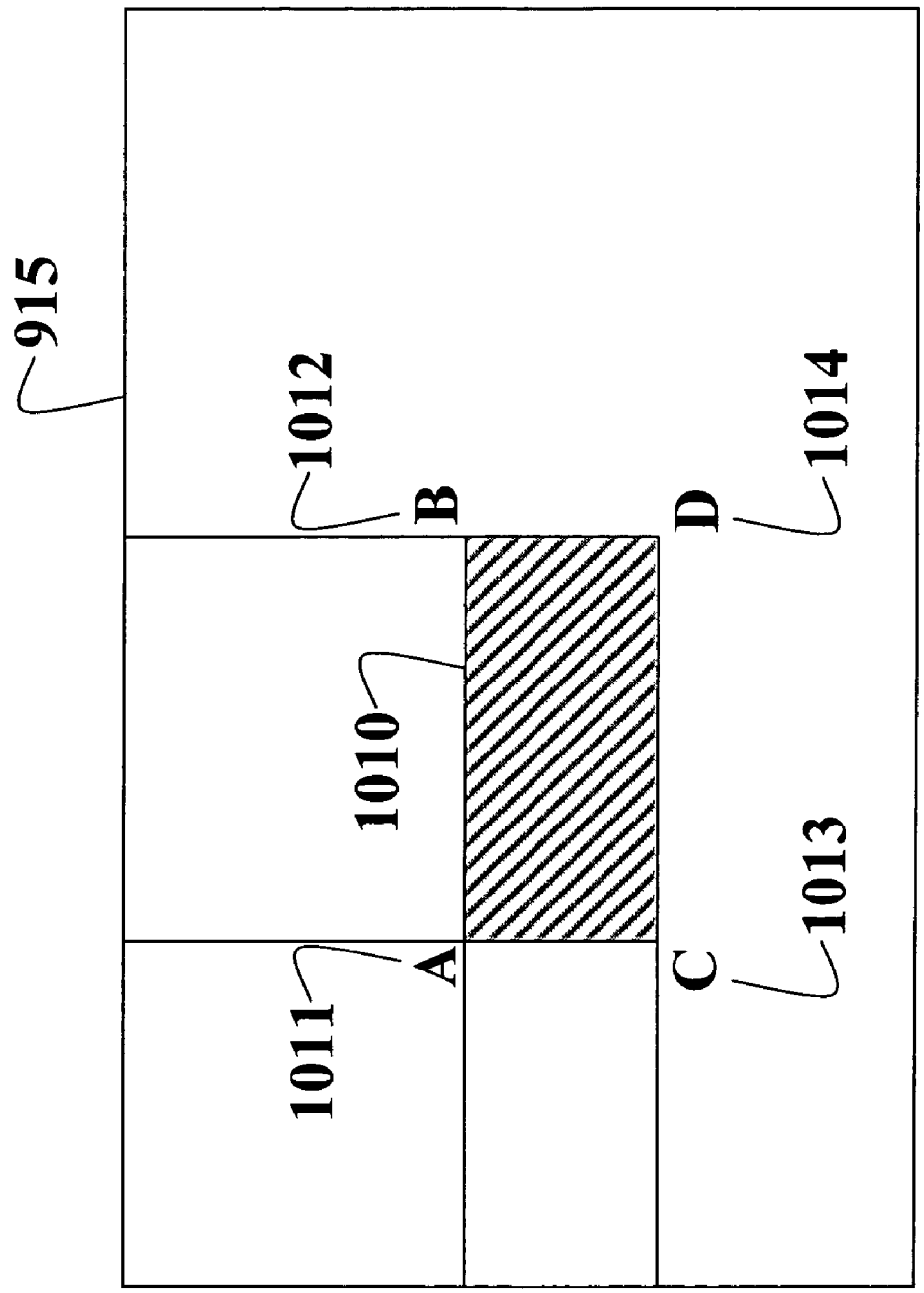
FIG. 10 is a block diagram of an integral image according to an embodiment of the invention.

In an integral image, values at each location (x, y) contain the sum of all pixel intensities above and to the left of the location (x, y), inclusive:

$$ii(x, y) = \sum_{x' \leq x, y' \leq y} i(x', y'), \qquad (8)$$

where ii(x, y) is an integrated pixel intensity value in the integral image and i(x, y) is a pixel intensity value in the unwrapped iris image. The unwrapped iris image 131 can be converted to the integral image 915 in one pass over the unwrapped iris image. As shown in FIG. 10, the sum of pixel intensities in a rectangular area 1010 of the integral image 915 with integral image values at corners A, B, C and D 1011-1014 of the rectangle ABCD 1010 can be determined as Area(ABCD)=A+D−B−C.

Filtering Using Difference of Sum (DoS) Filters

DoS Filters

Figures 11A, 11B:
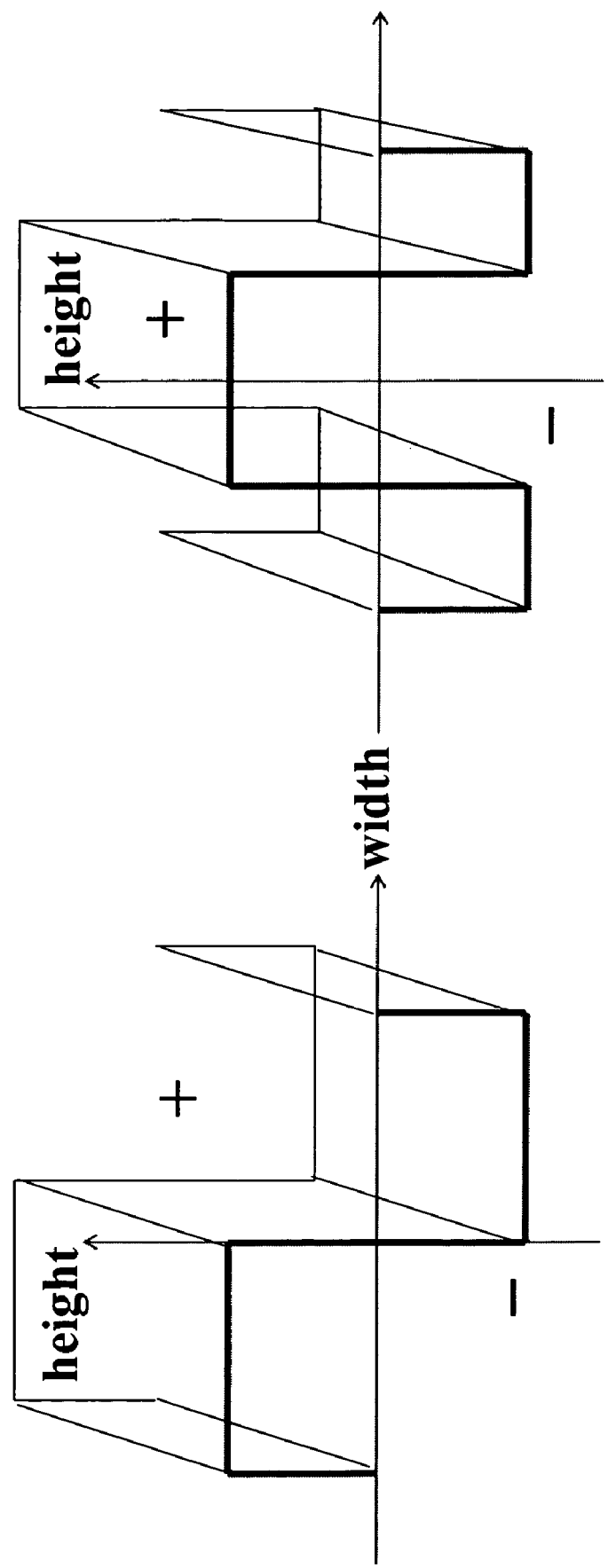
FIG. 11A is a block diagram of an odd symmetric filter according to an embodiment of the invention.
FIG. 11B is a block diagram of an even symmetric filter according to an embodiment of the invention.
Figures 11C, 11D:
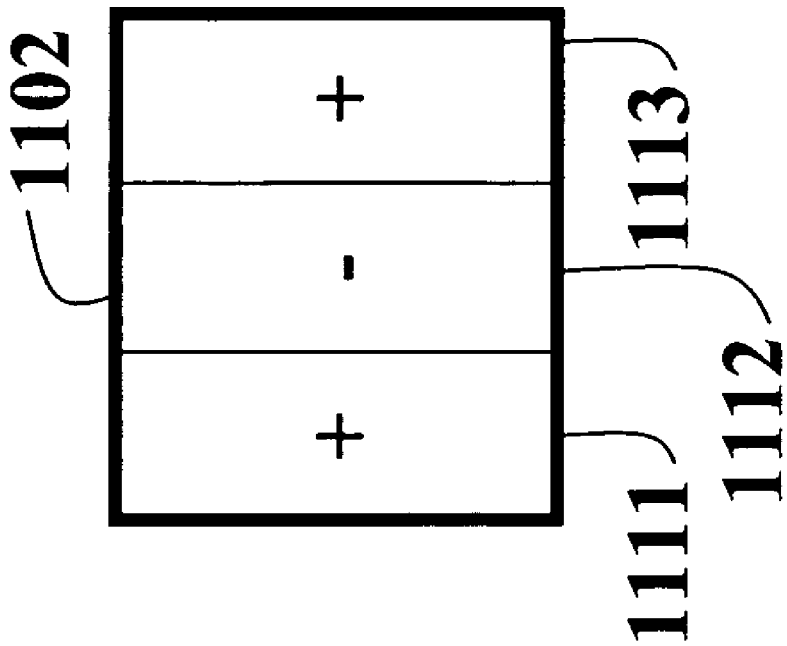
FIG. 11C is a block diagram of a prior art filter.
FIG. 11D is a block diagram of a difference of sum filter according to an embodiment of the invention.

According to an embodiment of the invention, we use difference of sum (DoS) filters to extract texture-based features from the iris image. Our DoS filters have a number of unique properties. First, the elements of the DoS filter are operators, instead of values. FIG. 11C shows a typical prior art filter 1101. Each of the nine elements in this filter corresponds to a pixel in the image to be filtered. In most techniques, the filter is 'moved' over the pixels in a raster scan order to filter all the pixels. Typically the elements are numeral values or integer weights, see also FIG. 4. During the filtering, each value is multiplied by the corresponding pixel intensity. The weighted intensities are then used to assign a central pixel value during a 'rewriting' step. In the filter 1102 according to invention in FIG. 11D, the elements of the filter are functions or operators, for example, summation and subtraction. Furthermore, the operators apply to a region of pixels. As shown, each operator is defined for multiple 1×3 adjacent regions of pixels. Essentially, the operator applies to all pixels in the corresponding region. For example, all the pixel intensities in regions 1101 and 1103 are summed, and the pixel intensities in region 1102 are subtracted. Then the results for all adjacent regions are totaled together, and reduced to a single binary digit, i.e., '0' or '1', according to some threshold. For example, if the total is positive, the digit is '1', otherwise the digit is '0'.

This binarized value is then the assigned value for all adjacent regions covered by the filter. Thus, the filter has two effects. The size of a representation of a number of pixels is greatly reduced, according to a factor set by the sizes of the adjacent regions, and the final filter output, for each application of the filter, is a single bit. Thus, the DoS filter according to the invention provides feature extraction, compression, and encoding.

In a particular embodiment, our rectangular difference of sum (DoS) filters for iris encoding have two basic cross-sectional shapes. FIG. 11A shows the 'odd' symmetric filter and FIG. 11B shows the 'even' symmetric filter. The odd symmetric filter has odd symmetry about a central axis of the filter, and an odd number of operators and corresponding regions. The even symmetric filter has even symmetry about the central axis of the filter, and an even number of operators and regions. The filters have only two possible operators, e.g., (+) and (−). Therefore, convolving the filters with a 'signal', for example a rectangular region of an image, determines the difference between the summations of the signal portions associated with the positive and negative parts of filters. Therefore, the filters are called difference of sum (DoS) filters.

Our DoS filters are superior to prior art filters in several ways. The design of the DoS filters is conceptually very simple. Prior art filters, such as the Gabor filters, are usually represented by an array of integer values, often approximating a function or functions used in the filtering. As an advantage, the DoS filters according to an embodiment of the invention can be represented by rectangular regions of operators. In addition, the operators can be represented by a single bit. Thus, the filter can have a very compact representation, even for large regions that cover many pixels in an image.

Unlike the determination of filter responses using prior art filters which involve multiplication and, therefore, more computation time, filter responses using DoS filters can be determined using only simple addition (+) and subtraction (−) operations.

As a further advantage, filtering with our rectangular DoS filters can be implemented with the integral image, as described above. That is, the output of the filter can be determined by a simple look-up in the integral image. This makes applying the DoS filters very fast.

Prior art iris filters, e.g., 2D Gabor filters, in polar coordinates are more complex:

$$G(p, \theta) = \exp(-iw(\theta-\theta_0))\exp(-(r-r_0)^2/\sigma_r^2)\exp(-(\theta-\theta_0)^2/\sigma_\theta^2),$$

and cannot be used with integral images.

DoS filters are inherently less sensitive to sources of error in the unwrapped iris image. Unlike prior art filters, both the odd and even symmetric DoS filters have a zero-sum to eliminate sensitivity of the filter response to absolute intensity values, and give a differential pair effect. The real components of prior art Gabor filters need to be biased carefully by truncation so that the bits in the resulting iris code do not depend on the pixel intensity. No truncation is necessary when using our DoS filters.

For feature extraction for the iris texture, we use a bank of pairs of two-dimensional DoS filters. The DoS filters in the bank all have the same height, for example, eight pixels, and various widths.

Figure 12:
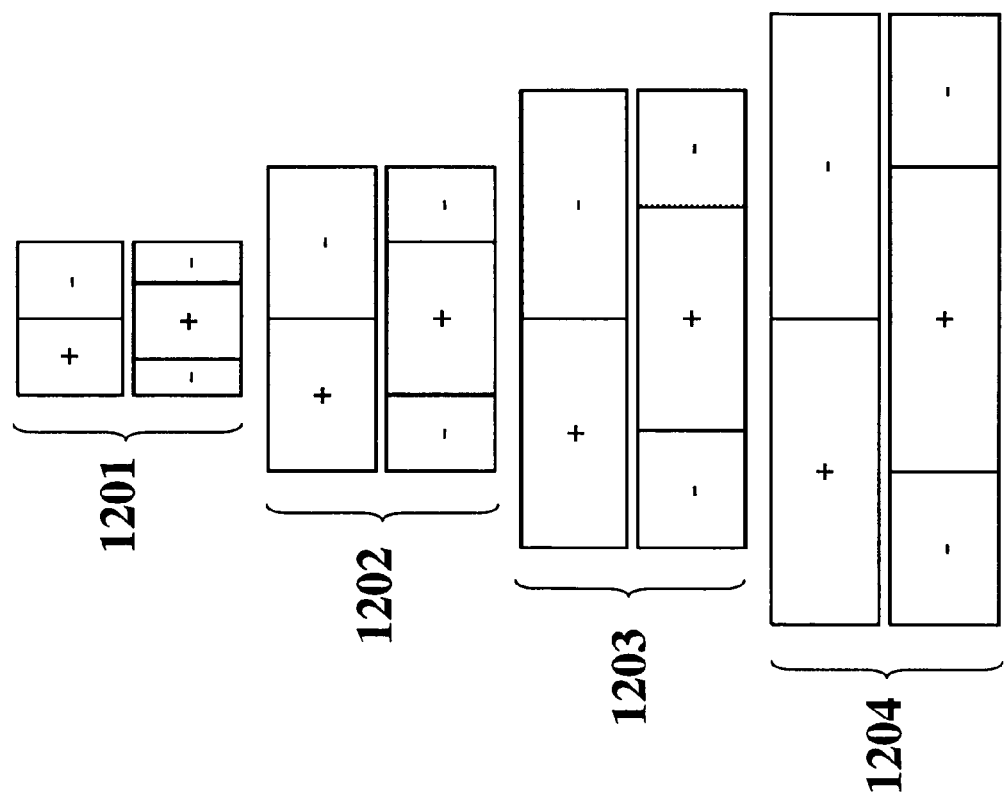
FIG. 12 is a block diagram of a bank of filters according to an embodiment of the invention.

FIG. 12 shows four pairs 1201-1204 of odd and even symmetric DoS filters with various widths for iris feature extraction. According to an embodiment of the invention, we use a bank of eight filters: an odd symmetric filter and an even symmetric filter for each of 12, 24, 36, 48 pixel widths. All filters have a height of eight pixels.

Filtering Using the DoS Filters

According to an embodiment of the invention, the bank of DoS filters is applied to iris images by dividing the integral images into several, e.g., eight, horizontal strips and then applying the filters within each strip at intervals. The intervals can be overlapping. The filtered output is real valued.

Binarization

A sign function is used to binarize the filtered output into discrete integer numbers, either 1 or 0, $$y = \text{sgn}(x) = \begin{cases} 1, & \text{if } x > 0 \\ 0, & \text{otherwise} \end{cases}, \quad (9)$$

where x is the result of the summation and subtraction, and y is the output of the filter.

Binarization makes the feature extraction less sensitive to noise in the iris pattern. For example, the images of the irises can be acquired at different viewing angles. Furthermore, the incident angles of light sources can change, and the iris localization can be less than perfect.

Indeed, this is particularly advantageous for real world applications, where it is difficult to control the pose of the subject, as well as ambient lighting conditions. Furthermore, images acquired during enrollment can be subjected to totally different pose and illumination conditions than those acquired later for later matching. Note also, different cameras can have different responses.

The binarized representation with a series of "1" and "0" bits improves the accuracy feature matching. The iris feature vector can be used for iris matching. According to an embodiment of the invention, A Hamming distance between a test iris feature vector and iris feature vectors stored in a database of iris images is determined, with six shifts to the left and to the right to compensate for iris rotation. The Hamming distance is the number of bits that differ between two binary strings. More formally, the distance between two feature vectors A and B is $\Sigma |A_i - B_i|$.

EFFECT OF THE INVENTION

A method for iris localization is described. The method utilizes both intensity gradients and texture differences between the iris and sclera and between the pupil and iris to determine iris inner and outer boundaries. A model is selected for representing the boundaries; the model can be either circular or elliptical. The method also provides means for unwrapping an image of an iris, and for masking occluded areas.

A method for extracting features of an iris in an image is also described. An unwrapped iris image is converted to an integral image by summations of pixel intensities. A bank of difference of sum filters is used to filter the integral image. The filtered output is binarized to produce the iris feature vector. The iris feature vector is used for iris matching.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for localizing pixels representing an iris in an image acquired of an eye, comprising a computer system for performing steps of the method, comprising the steps of:
    determining gradient information from an image acquired of an eye;
    determining texture information from the image; and
    combining the gradient information and the texture information to generate boundaries of an iris image including pixels representing an iris in the image of the eye.

2. The method of claim 1, in which the gradient information is determined using an integro-differential operator.

3. The method of claim 1, in which the determining of the texture information further comprises:
    defining an inner zone of pixels and an outer zone of pixels in the image;
    constructing histograms to represent the pixels in the inner zone and the outer zone; and
    measuring a difference between the histograms to determine the texture information.

4. The method of claim 3, in which the constructing further comprises:
    determining values of the pixels using a local binary pattern operator.

5. The method of claim 3, in which the difference is a Kullback-Leibler divergence.

6. The method of claim 1, in which the boundaries include an inner boundary and an outer boundary.

7. The method of claim 6, further comprising:
    unwrapping the iris image according to the inner boundary and the outer boundary to produce an unwrapped iris image;
    detecting occlusions in the unwrapped iris image; and
    generating a mask for each occlusion.

8. The method of claim 7, further comprising:
    defining a first region of the unwrapped image where an occlusion cannot occur;
    defining a second region of the unwrapped image where an occlusion may occur;
    constructing histograms to represent the pixels in the first and second regions;
    determining a distance between the histograms; and
    generating a mask in the second region only if the distance is greater than a predetermined threshold.

9. The method of claim 8, in which the distance is a chi-square distance.

10. The method of claim 7, in which the mask is generated according to the edge information and the texture information.

11. A method for localizing pixels representing an iris in an image acquired of an eye, comprising a computer system for performing steps of the method, comprising the steps of:
    measuring a gradient magnitude of pixel intensities in an image of an eye;
    determining a texture difference in the image;
    combining the gradient magnitude and the texture difference;
    defining boundaries of an iris image, including pixels representing an iris in the image, according to the combination of the gradient and the texture difference.

12. The method of claim 11, in which a particular boundary is selected using a set of circles, the selecting further comprising:
    repeating the measuring and the determining for each circle in a set of circles;
    combining the gradient information and the texture difference for each circle; and
    assigning a circle in the set of circles as the boundary, the circle having a maximum of the combination of the gradient magnitude and the texture difference.

13. The method of claim 12, in which the centers of the circles in the set of circles are approximate to a center of a pupil in the image of an eye.

14. The method of claim 11, in which the boundaries are elliptical.

15. The method of claim 12, further comprising,
repeating the measuring, determining, and combining in a region approximate to the boundary to generate contours;
fitting an ellipse to a longest contour; and
reassigning the ellipse as the boundary if an eccentricity of the ellipse is greater than a threshold, else keeping the circle as the boundary.

16. The method of claim 15, in which the threshold is 0.19.

* * * * *